United States Patent Office 3,122,519
Patented Feb. 25, 1964

1

3,122,519
PROPYLENE RESIN STABILIZED WITH A MIXTURE OF A PARA-TERTIARYALKYLPHENOL-FORMALDEHYDE RESIN AND A MERCAPTO COMPOUND
Bernard O. Baum, Plainfield, N.J., assignor to Union Carbide Corporation, a corporation of New York
No Drawing. Filed Feb. 23, 1960, Ser. No. 10,057
6 Claims. (Cl. 260—43)

This invention relates to improved propylene polymer compositions. More particularly, it relates to stabilized polypropylene compositions having improved color.

Solid polypropylene is recognized in the plastics industry as possessing great commercial potential because of some advantages it has over polyethylene. For example, it has a higher melting temperature, a lower density and greater stiffness moduli than polyethylene. Polypropylene polymers can be produced in amorphous or crystalline form depending upon the catalysts employed and the reaction conditions. The highly crystalline polypropylenes having melt indices (measured at 190° C.) within the range of from about 0.01 to about 50 are particularly suitable for use in the production of fibers, films and other extruded and molded items. These high molecular weight, highly crystalline polypropylenes are characterized by their clarity, their high toughness and strength, their good mechanical resiliency and their stiffness moduli.

Unfortunately, propylene polymers are subject to severe deterioration from the oxidative action of air at elevated temperatures. For example, fibers that are melt spun from polypropylene and have high initial strengths, 4 to 5 grams per denier, lose about 50 percent of their strength within about 50 hours after being placed in a circulating air oven at 125° C., and tend to disintegrate completely within about 100 hours to a powdery material. The stability of unstabilized crystalline polypropylene to heat aging also varies with the amount of impurities or catalyst residue remaining in the polymer, and in certain cases, the polymer is so unstable that fibers produced therefrom disintegrate within 5 to 10 hours at 125° C. This susceptibility of polypropylene to deteriorate under such conditions is much greater than that observed with most other high molecular weight polyolefin resins. This can be seen when one considers that unstabilized polyethylene fibers can withstand 500 hours at 100° C. without serious loss in strength.

Polypropylene can be stabilized against thermally induced degradation with a great variety of phenolic resins, among which are the uniquely effective low molecular weight p-tertiary alkylphenol-formaldehyde resins. The so-stabilized polypropylene compositions are more resistant to air oxidation and thermal degradation during compounding and are able to endure the forming temperatures with no significant reduction of strength or electrical properties. However, relatively large concentrations, i.e., 0.1 to 2 percent or more, are needed to provide the degree of stabilization generally required especially for fiber applications. Unfortunately, the phenolic resins impart a brownish-yellow color to the polypropylene. The higher the concentration of the phenolic resin the greater is the discoloration.

It is therefore the general object of the present invention to provide propylene resin compositions containing

2 stabilizing amounts of phenolic resin stabilizers which are much improved with respect to color.

This general object as well as others which will be obvious from the specification and the appended claims is achieved by the compositions of the present invention which comprise a normally solid polymer of propylene, a phenolic resin stabilizer therefor, and a mercaptan selected from the group consisting of 2-naphthalenethiol; and poly(decamethylenedithiol-1,10).

The propylene polymers which are suitably employed in the compositions of the present invention are those which are normally solid at room temperature. Several methods of preparing propylene polymers are known in the art, as for example, the processes described in Australian patent application No. 6,365/55 to Phillips Petroleum Company, United States Patent No. 2,692,259 to Edwin F. Peters and United States Patent No. 2,791,576 to Edmund Field. Copolymers of propylene with other olefinic and vinyl monomers such as ethylene and styrene, particularly those copolymers containing a major proportion of propylene polymerized therein, are also effectively employed.

The low molecular weight para-tertiarylkylphenol-formaldehyde resins suitable for use in this invention are the A-stage resins produced by the reaction of para-tertiaryalkyl-phenols with formaldehyde in the presence of a catalyst. The A-stage of a phenol-formaldehyde resin is the early stage in the production of those thermosetting resins in which the product produced is still soluble in certain liquids and fusible. This stage in the production of thermosetting resins is distinguished from the B-stage and C-stage. The B-stage is an intermediate stage in the reaction of a thermosetting resin in which the product softens when heated and swells when in contact with certain liquids, but does not entirely fuse or dissolve. The C-stage is the final stage in the reactions of a thermosetting resin in which the material is relatively insoluble and infusible. Thermosetting resins in a fully cured state are in this stage.

The A-stage resins used as anti-oxidants in this invention are those produced by the reaction of para-tertiaryalkyphenols with formaldehyde in the presence of a suitable catalyst, such as oxalic acid, by procedures which are well known in the plastics art. Among the para-tertiarylkylphenols which can be used in producing the suitable A-stage resins by reaction with formaldehyde are the para-tertiaryalkylphenols, in which the alkyl group contains from 4 to about 20 carbon atoms or more, preferably from 4 to about 10 carbon atoms, such as para-tertiarybutylphenol, para-tertiaryamylphenol, para-tertiaryheptylphenol, para-tertiarynonylphenol and the like.

Illustrative of the A-stage resins that can be used to control the oxidative degradation of polypropylene are para-tertiarybutylphenol-formaldehyde resin, para-tertiaryamylphenol-formaldehyde resin, para-tertiarynonylphenol-formaldehyde resin, para-tertiarydodecylphenol-formaldehyde resin and the like. The resins can be be prepared from the pure para-phenol or from a mixture of para-phenol with the ortho and/or meta isomers. However, the effectiveness of the A-stage resins as antioxidants is dependent in very large measure upon the para-tertiaryalkylphenol content in the resin. Thus, even though an A-stage resin formed from a mixture of isomeric alkylphenols having a major proportion of the para isomer is an effective constituent of the present compositions, larger quantities of the A-stage resin are needed in order to have a sufficient concentration of the para-tertiary-alkylphenol-formaldehyde resin in the polypropylene to give equivalent stabilization to that achieved when a para-tertiarybutylphenol-formaldehyde resin produced from para-tertiarybutylphenol alone is utilized. Also, mixtures of two or more para-tertiaryalkylphenol-formaldehyde resins can be employed.

The mercapto compounds suitably employed in the compositions of this invention are 2-naphthalenethiol and poly(decamethylenedithiol-1,10). All three of these materials are readily available on a commercial basis, and prepared according to methods well known in the art. The poly(decamethylenedithiol-1,10) for example can be prepared by the simple condensation of 1,10-dichlorodecamethylene with $Na_2S$, or by oxidizing decamethylenedithiol-1,10 with an oxidizing agent such as potassium permanganate. The preferred poly(decamethylenedithiol-1,10)s are those which are soluble in ethanol at room temperature, i.e., 20–25° C.

Despite the structural similarities of the mercapto compounds of the present invention to the vast number of monomeric and polymeric mercaptans, disulfides, thiazolines, tetrasulfides, sulfoxides, and thiocarbanilides known in the art, the mercapto compounds herein employed have been found to be unique in that they impart no objectionable odor to polypropylene, and they not only prevent discoloration otherwise imparted by the phenolic resin stabilizers but in addition reduce the discoloration of the final composition significantly below that of the unmodified polypropylene itself.

The proportions of phenolic resin stabilizer and mercapto decolorizer useful in the present invention both with respect to the propylene polymer and to each other are not narrowly critical and can be varied over wide limits depending upon the thermal stability and color requirements for any particular application of the overall composition. In general, however, the phenolic resin stabilizer is present in an amount of from about 0.01 to about 5.0 percent by weight, or even greater, based on the weight of the propylene resin. Preferably from about 0.5 to about 2.0 percent by weight is used. Copolymers containing vinyl monomers interpolymerized with the propylene require less phenolic resin stabilizer as a rule than do the copolymers of propylene with other olefin monomers or propylene homopolymers.

The mercapto compounds which serve as decolorizers in the compositions, either alone or in admixture, are generally employed in amounts of from at least about 10 percent to about 200 percent by weight based on the weight of the phenolic resin stabilizer. Preferably, the minimum amount of the mercapto decolorizer present is at least about 0.02 percent by weight based on the weight of the propylene resin irrespective of the amount of phenolic resin stabilizer used. When at least 0.1 percent by weight of the phenolic resin is present, the most favorable proportion of mercapto compound decolorizer to phenolic resin is in the range of about 0.2 to 1.0 part per part phenolic resin.

Whereas the proportion of phenolic resin to propylene polymer, and the proportion of the mercapto compound to phenolic resin as set forth above are satisfactory to produce a stable product having a color sufficiently light for all but the most unusual use requirements, it is to be understood that greater or lesser quantities of either the phenolic resin or the mercapto compound can be utilized without departing from the spirit and proper scope of the present invention. In a practical sense, however, greater latitude can be exercised with respect to the concentration of the phenolic resin than with the mercapto compound.

The phenolic resin stabilizer and the mercapto compound decolorizer can be incorporated into the propylene polymer by any suitable conventional means, for example, by fluxing the propylene polymer with the additives on heated rolls, by the use of Banbury mixers, or of heated extruders, and the like.

The following examples will serve to further illustrate the present invention.

In the examples, at each occurrence the following definitions and characterizations apply:

*Yellowness index (color).*—The yellowness index reported is the quotient of the degree of yellowness divided by the degree of whiteness of any given polypropylene composition tested. Yellowness and whiteness are based on color reflectance measurements made on molded plaque samples by means of a spectrophotometer modified for reflectance measurements (Beckman model "B" abridged). The reflectance over vitrolite, an arbitrarily chosen reflectance standard, was measured on the plaque samples at wave lengths of 550 m$\mu$ and 430 m$\mu$. Whiteness is based on the percentage reflectance at 550 m$\mu$ and yellowness is based on the percentage reflectance at 430 m$\mu$. The yellowness index is therefore equal to $$\frac{R_{500\ m\mu} - R_{430\ m\mu}}{R_{550\ m\mu}}$$

in which R is the percentage reflectance at the wave length indicated by the subscript. The smaller the quotient, the lighter the color of the composition.

*Polypropylene resin.*—The propylene homopolymer employed is a typical normally solid polypropylene having a melt index of 1.3 decigrams per minute, a density of 0.908 gram per milliliter at 23° C. and a tensile modulus of 152,000 pounds per square inch.

*Thermal stability (induction period in hours in air at 150° C.).*—As a measure of the thermal stability, the composition tested was compression molded into 30 mil thick plaques which were then suspended in a 150° C. circulating air oven. Periodically the plaques were examined and subjected to a manually applied bending force. The plaques either sustained the applied force without discernible ill effects or crumbled into small powdery fragments. Of the plaques tested, none exhibited any in-between behavior. The time period during which the plaque could resist the applied force is called the induction period.

*Phenolic stabilizer.*—An A-stage para-tertiaryamylphenol-formaldehyde resin having a softening point of 185° F. prepared by the oxalic acid catalyzed condensation of para-tertiaryamylphenol and formaldehyde under reflux conditions. The condensation product mass was then vacuum distilled to remove formed water, unreacted phenol and low molecular weight condensation products, and thereafter cooled and ground.

*Odor.*—The determination of degree of odor development was made by placing a sample of approximately 20 grams of a polypropylene in a tightly sealed jar and allowing same to stand at normal room temperature for a period of 24 hours. Other samples of the same polypropylene containing the mercaptan additive were similarly treated. At the end of the 24-hour period the odor of the vapors in each jar was noted and compared.

EXAMPLES 1–5

The unique decolorizing action of the mercapto compounds of the present invention was demonstrated by preparing a series of polypropylene compositions, some of which contained only the mercaptan. The compositions were prepared by admixing the modifiers with the polypropylene immediately after the polypropylene had been fluxed and sheeted on a two-roll mill at 170° C. The modifiers were thoroughly blended with the fluxed polypropylene by successively end-passing the mixture through the mill nip ten times. For control the same polypropylene was hot processed according to the same procedure, one portion receiving no modifiers, and four portions being admixed with each of four phenolic resin stabilizers in amounts of 1.0 percent, by weight. A portion of all compositions so prepared was compression molded and subjected to testing. The results are reported in Table I below.

*Table I*

| Example | Polypropylene Composition | | Thermal Stability [b] | Yellowness Index | Odor |
|---|---|---|---|---|---|
| | Additive | Conc. of Additives [a] | | | |
| Controls | none | | 8 | 0.30 | (c) |
| | p-t-amylphenol/CH$_2$O resin | 0.5 | 42 | 0.59 | (c) |
| | do | 1.0 | 73 | 0.75 | (c) |
| | p-t-butylphenol/CH$_2$O resin | 1.0 | 77 | 0.72 | (c) |
| | p-t-phenylphenol/CH$_2$O resin | 1.0 | | 0.70 | (c) |
| | p-t-amylphenol trimer | 1.0 | 22 | 0.73 | (c) |
| | poly(decamethylenedithiol-1,10) | 0.1 | 12 | 0.27 | (c) |
| | do | 0.5 | 12 | 0.19 | (c) |
| | 2-naphthalenethiol | 0.1 | 8 | 0.29 | (c) |
| | do | 0.5 | 8 | 0.20 | (c) |
| 1 | p-t-amylphenol/CH$_2$O resin + poly(decamethylenedithiol-1,10) | 1.0 / 0.5 | 190 | 0.21 | (c) |
| 2 | p-t-amylphenol/CH$_2$O resin + poly(decamethylenedithiol-1,10) | 0.5 / 0.5 | 160 | 0.29 | (c) |
| 3 | p-t-amylphenol/CH$_2$O resin + 2-naphthalenethiol | 0.5 / 0.5 | 42 | 0.22 | (c) |
| 4 | p-t-butylphenol/CH$_2$O resin + 2-naphthalenethiol | 1.0 / 0.5 | 79 | 0.29 | (c) |

[a] Percent by weight based on the weight of polypropylene.
[b] Induction period at 150° C. in air, hrs.
[c] No objectionable odor development.

For purposes of comparison a wide variety of sulfur-containing compounds having some structural similarity to the mercapto compounds of the instant invention were tested in combination with a phenolic resin stabilizer in polypropylene. Using the same procedure set forth in Examples 1–5 and using the same polypropylene and p-t-amylphenol/CH$_2$O resin the following results were obtained from several of the experiments.

*Table II*

| Experiment | Polypropylene Composition | | Thermal Stability [b] | Yellowness | Odor |
|---|---|---|---|---|---|
| | Additive | Conc. of Additives [a] | | | |
| a | none | | 8 | 0.30 | good. |
| b | p-t-amylphenol/CH$_2$O resin | 1.0 | 73 | 0.75 | Do. |
| c | p-t-amylphenol/CH$_2$O resin + n-tetradecyl mercaptan | 1.0 / 0.5 | 73 | 0.55 | poor. |
| d | p-t-amylphenol/CH$_2$O resin + zinc salt of 2-mercaptobenzothiazole | 1.0 / 0.5 | 73 | 0.45 | Do. |
| e | p-t-amylphenol/CH$_2$O resin + thiocarbanilide | 1.0 / 0.5 | 86 | 0.53 | Do. |
| f | p-t-amylphenol/CH$_2$O resin + 1-octanethiol | 1.0 / 0.5 | 73 | 0.58 | Do. |
| g | p-t-amylphenol/CH$_2$O resin + -mercaptoethyl-3-mercaptocyclohexanone | 1.0 / 0.5 | 73 | 0.49 | Do. |
| h | p-t-amylphenol/CH$_2$O resin + 2-mercaptothiazoline | 1.0 / 0.5 | 73 | 0.65 | Do. |

[a] Percent by weight based on weight of polypropylene.
[b] Induction period at 150° C. in air, hrs.

EXAMPLE 7

A styrene-propylene copolymer having a melt index of about 0.03 and containing an interpolymerized styrene to propylene ratio of 18:82 was blended with .5 percent by weight of an A-stage p-tertiarybutylphenol/CH$_2$O resin having a softening point of 266° F. and a specific gravity of 1.04 and prepared by the oxalic acid catalyzed condensation of p-tert-butylphenol and formaldehyde under reflux conditions. A portion of this blend was further blended with .5 percent by weight of 2-naphthalenethiol. Each of the compositions was compression molded and yellowness index determinations were made. The compression molded sample containing both the phenolic resin stabilizer and the decolorizer was found to have a yellowness index of 0.26. The sample containing only the phenolic resin stabilizer had a yellowness index of 0.57.

The polypropylene compositions of the present invention find particular utility, because of their resistance to oxidation degradation, as extruded or spun textile fibers and yarns. These compositions find additional utility in the form of films and sheets suitable for packaging, and in the form of a wide variety of extruded and molded articles. The propylene resins effectively stabilized by the stabilizer compositions of the present invention include copolymers of propylene and other olefinically unsaturated monomers such as ethylene and propylene provided the propylene interpolymerized therein is present in an amount of at least about 50 percent by weight, preferably at least about 80 percent by weight. The term "propylene resin" or "propylene polymer" as used herein is intended, therefore, to include such copolymers as well as propylene homopolymers.

The composition can also include conventional additives such as colorants, lubricants, slip agents, plasticizers, fillers and the like, and can be admixed with other polymeric materials either compatible or incompatible with polypropylene.

What is claimed is:

1. A decolorized propylene resin composition stable toward oxidative degradation which comprises a normally solid propylene polymer containing at least 50 percent by weight of interpolymerized propylene, a stabilizing amount of an A-stage para-tertiaryalkylphenol-formaldehyde resin in which the alkyl group of the para-tertiaryalkylphenol contains from 4 to 20 carbon atoms, and a decolorizing amount of a mercapto compound selected from the group consisting of poly(decamethylene-dithiol-1,10) and 2-naphthalenethiol.

2. The composition according to claim 1 wherein the alkyl group of the para-tertiarylalkylphenol contains from 4 to 10 carbon atoms.

3. The composition according to claim 2 wherein the A-stage para-tertiaryalkylphenol-formaldehyde resin is present in an amount of from about 0.05 to about 5.0 percent by weight based on the weight of the propylene polymer, and the mercapto compound is present in an amount of from about 10 to about 200 percent by weight based on the weight of the A-stage phenolic resin.

4. The composition according to claim 3 wherein the mercapto compound is 2-naphthalenethiol.

5. The composition according to claim 3 wherein the propylene polymer is a normally solid propylene homopolymer.

6. The composition according to claim 3 wherein the mercapto compound is poly(decamethylenedithiol-1,10).

References Cited in the file of this patent

UNITED STATES PATENTS

| 2,163,637 | Thomas | June 27, 1939 |
| 2,240,582 | Sparks | May 6, 1941 |
| 2,727,879 | Vincent | Dec. 20, 1955 |
| 2,804,444 | Segro et al. | Aug. 27, 1957 |
| 2,967,848 | Hawkins et al. | Jan. 10, 1961 |
| 2,967,849 | Hawkins et al. | Jan. 10, 1961 |
| 2,968,641 | Roberts et al. | Jan. 17, 1961 |
| 2,985,617 | Salyer et al. | May 23, 1961 |
| 3,004,949 | Chevassus | Oct. 17, 1961 |
| 3,020,259 | Schulde et al. | Feb. 6, 1962 |